Nov. 4, 1958 K. S. DUNLAP 2,859,283

COMMUNICATION SWITCHING NETWORK

Filed Oct. 19, 1956 2 Sheets-Sheet 1

INVENTOR
K. S. DUNLAP
BY [signature]
ATTORNEY

Nov. 4, 1958 K. S. DUNLAP 2,859,283

COMMUNICATION SWITCHING NETWORK

Filed Oct. 19, 1956 2 Sheets-Sheet 2

INVENTOR
K.S. DUNLAP
BY
ATTORNEY

United States Patent Office 2,859,283

Patented Nov. 4, 1958

2,859,283

COMMUNICATION SWITCHING NETWORK

Kermit S. Dunlap, Madison, N. J., assignor to Bell Telephone Laboratories, Incorporated, New York, N. Y., a corporation of New York Application October 19, 1956, Serial No. 617,087

11 Claims. (Cl. 179—18)

Figure 1:
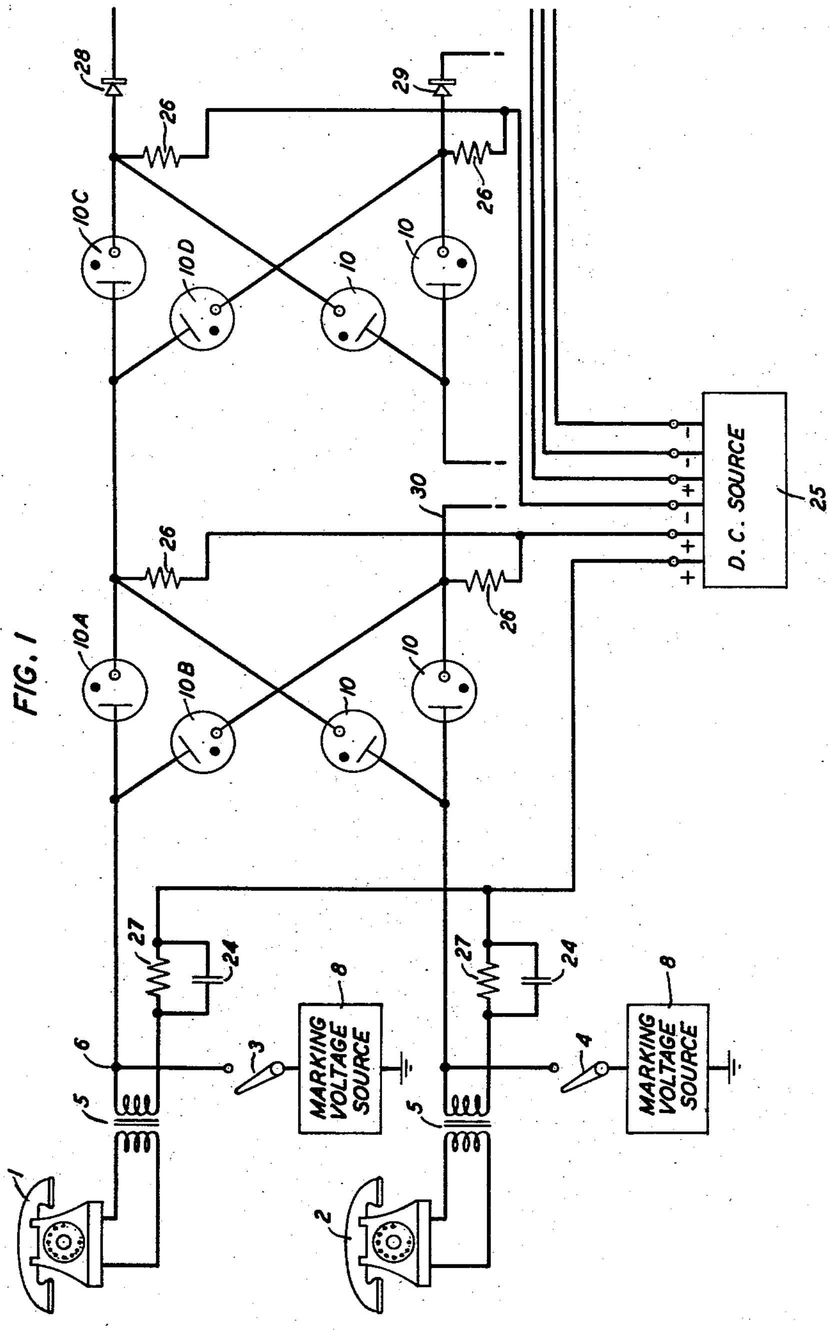

This invention relates to communication switching networks and, more particularly, to such networks as employed in telephone switching systems employing gaseous discharge devices.

Switching networks are known which contain a large number of interconnected gas tubes as the crosspoint devices of the network, which tubes may be rendered conductive selectively to establish paths between predetermined input and output terminals. Such a network is fully described in Patent 2,684,405, issued July 20, 1954, of E. Bruce and H. M. Straube, which patent also discloses the supervisory and other circuits for recognition of the condition of subscriber's lines and trunks and for accomplishing the necessary switching in response thereto.

In the prior switching networks of the type disclosed in the above-mentioned patent, one of the possible paths through the network is established on application of marking potentials to a particular input terminal, which may be a line terminal, and to a particular output terminal, which may be a trunk terminal, while suitable marking potentials are also applied, through appropriate switches or switching circuits, to the nodes within the network. A node is defined at each connection of the crosspoints within the network.

These networks have accordingly required both the selective marking of the network terminals and nonselective marking of all interior nodes of the network. In addition to the marking potentials, sustaining voltages are also applied to the terminals and to the nodes. Priorly, the sustaining voltage has been applied to the terminals through impedances of high values, designated as lockout impedances. Lockout is defined as that condition which exists when any random interconnection of lines is prevented between an established path and an additional path in the process of being established or already established.

In the prior networks when a conducting path has been established between a marked input and a marked output terminal, gas tubes in alternate and incomplete paths which were ionized during the marking process are deionized because of both the reduction in potential at the marked terminals caused by the relatively high current through high valued terminal impedances and also because the voltage at the nodes is changed by switching from the high valued mark potential source to the lower value hold or sustain potential source.

This arrangement has several disadvantages, including the power losses due to the utilization of high lockout impedances in the established path and also the switching complexities due to the requirement for internal node marking.

It has priorly been suggested that a high lockout impedance need only be utilized at one marked terminal of the network and that a low terminal impedance could be utilized at the other terminal, together with the nonselective marking of the interior nodes of the network. Thus, in R. W. Ketchledge application Serial No. 509,750, filed May 20, 1955, now Patent 2,843,674, issued July 15, 1958, there is disclosed a crosspoint switching network through which multiple paths may be interconnected. This network utilizes marking sources at the line and trunk terminals having different serially connected impedances to achieve a common connection between several lines. A zero or low impedance trunk marking source and a lockout or high impedance line marking source are employed. Crosspoints in all stages except those in the match stage, which in this particular instance is that stage adjacent to the line terminals, may be marked by connecting the low impedance trunk marking source to one of the trunk terminals. The match stage is marked from the line terminal by the application of a marking potential from the high impedance source. Only one crosspoint in the match stage will be ionized due to the immediate potential drop or lockout in the high impedance source. All of the crosspoint devices connected to the low impedance trunk marking source will remain ionized until the paths are established through the network, at which time the terminal-to-terminal current flowing through the high terminal impedances on the line side together with the reduction of node potentials by means of switches cause lockout or deionization of the crosspoints in the unselected paths. The several selected paths between the several selected line terminals and the selected trunk terminal will, however, remain established.

In these networks when marking voltages are applied to selected input and output terminals, marking pulses progress across the network. Variations in marking voltages may increase progressively as the marking pulses progress from the terminals toward the center of the network because of the variability of crosspoint tube characteristics and because of the over-voltage employed to mark the terminals to insure adequately small ionization times. When these voltage variations combine in the network, they may be sufficient to cause false operation of a crosspoint between a path being established and a path already established, causing a false cross-connection intermediate the network. In order to assure proper operation of the network, suitable voltage margins must be maintained. Voltage margins may be defined as the difference between the voltage required to be applied to a node to mark or ionize a path from that node and the voltage required to sustain a path from that node.

I have discovered an improved network in which the above-mentioned problems are overcome and unique operations are achieved by a novel network combination. This novel combination removes the necessity for varying the potentials at interior nodes and thereby enables elimination of the switches which controlled the node potentials in prior networks of this general type; my novel combination further involves shifting the operating points of the crosspoint device to insure lockout of the crosspoints in the unselected paths on a node impedance basis rather than a terminal impedance basis. Additionally, in my improved network, bisectors are inserted in the transmission paths intermediate the network to prevent a combination of marking voltage variations from the respective input and output terminals. Bisectors improve the voltage margins of a crosspoint network by isolating voltage variations on either side of the bisector. Since the bisected network is nevertheless marked at its input and output terminals, both marking voltages progress toward the center of the network. However, neither marking signal can progress beyond the bisector such that it will combine with the marking voltage on the other side. Further, in accordance with an aspect of my invention, the node voltages are automatically controlled by connecting a source of idle potential appreciably greater than the crosspoint sustaining potential but less than the crosspoint ionization potential continuously across the crosspoint devices through unusually high valued resistors, this being the only potential source connected to each crosspoint device during operation of the network.

Accordingly, it is a general object of this invention to provide an improved gas tube switching network.

More specifically, it is an object of this invention to enable selection of a single path through such a network on selective marking of the external terminals only without the necessity for nonselective marking of the interior nodes of the network.

It is a further object of this invention to reduce the power requirements of such networks and to enable the extinction of gas tubes in nonselected paths to occur automatically on establishment of a single path through the network.

Briefly, in accordance with aspects of this invention, each crosspoint node is permanently connected to a source of potential such that the voltage applied across the crosspoint gas tube is substantially intermediate the ionizing or breakdown voltage and the sustaining voltage of the tube. Connected between the source of potential and the nodes is an impedance of a high value such that current flowing from the marked terminal through the tube and to the source of potential flows through this impedance.

Marking voltages are applied to both selected input and output terminals of the network and these marking voltages progress as pulses through the network, ionizing an increasing number of crosspoints, as is known in the art. When a crosspoint diode begins to ionize, it first passes a very low current in the order of a few microamperes. This current, in turn, increases the ionization within the tube until a relatively high negative resistance region is reached. In this region, the tube current increases without an increase in the applied potentials. After the tube current reaches a certain value, for example, 75 microamperes, a second negative resistance region is reached in which the negative resistance is relatively low.

In accordance with other aspects of this invention, the marking voltage is maintained at the terminals until a unique path is established and the crosspoints in the unselected paths remain ionized in response to this marking voltage. Then the marking voltage is removed, restoring the terminal voltage to the permanently applied sustaining potential which, in accordance with an aspect of my invention, is applied through a low impedance and not through a high lockout impedance. If now, the sustaining current flows through both low impedances connected between the source of permanently applied potential and the end devices, which is true for only those devices in the unique path, then those devices in the unique path will be sustained. Under this arrangement, the actual sustaining potential for the unique path is applied at the terminals of the network rather than across the individual stages of the network. If, however, the sustaining current for a crosspoint device flows through one of the high valued node resistors, which will be true for the crosspoint devices in the unselected paths, the current flow through the node resistor will cause a sufficient potential drop to reduce the potentials across these unselected crosspoints below the sustaining value and they will be deionized. Each crosspoint device most remote from the marked terminal in the unselected paths sees a high load impedance, namely, that of its node resistor. The sustaining current for this remote device flowing through the node resistor reduces the potential applied across this device below the sustaining value and this remote device is extinguished. The operation is repeated for the next device in the unselected path and this next device in turn is extinguished. This operation progresses along the unselected paths toward the selected terminal until all of the devices in the unselected paths are extinguished.

In this improved network, no switching devices are required to change the node voltages after the unitary path is established through the network and the marking voltage is removed, for this is automatically accomplished by the unique combination of the applied potentials and serially connected resistors. Further, the network terminal impedance may be reduced in value; thus, as low impedance sustaining potential sources are connected to the terminals rather than high lockout impedances, the power loss of the network during transmission of speech or other currents through it is considerably reduced.

In accordance with still other aspects of this invention, semiconductor diodes are serially connected in the transmission network intermediate the crosspoint stages. These semiconductor diodes are normally back-biased and marking voltages from the line side of the network will not progress through the bisector due to the back-bias, the marking voltage applied to one side of the bisector being insufficient to overcome the back-bias. Similarly, marking voltages applied from the trunk or output side of the network will not progress beyond the bisector. The back-bias on the diode is maintained when a marking pulse arrives at only one side of the bisector. However, if marking pulses progress from the respective terminals to both sides of a semiconductor diode or bisector, the back-bias will be overcome and the diode will be forward biased permitting communications currents to flow through the network. Thus, the marking voltage margins of this network are that of a network having half as many stages as the bisected network. Further, the bisector, rather than a stage of crosspoints, becomes the match stage or component at which the unique path is completed. An examination of the margin problems establishes that the factors tending to reduce the margins are primarily those associated with the marking of a path and only secondarily those associated with holding or maintaining the path after it is established. The margins of the bisected network therefore approximate those of a network of half the number of stages.

It is a feature of this invention to connect a source of potential across each of the crosspoint devices, the magnitude of which is substantially intermediate the sustaining and ionizing values of the crosspoint devices, which potentials are connected to the crosspoint devices through high valued resistors. This potential is appreciably greater than the sustaining voltage of the crosspoint tube and is advantageously of the order of midway between the sustain and breakdown voltages.

It is another feature of this invention to connect and disconnect the terminal marking source in combination with high impedance sources permanently connected to the nodes to establish a unitary path through the network while insuring lockout of the ionized crosspoint devices in the unselected paths. Further, in accordance with this feature of this invention, the sustaining voltage for the complete transmission path at the terminals of the network is applied through low impedance sources after the establishment of a unitary path through the network and the removal of the marking source.

It is another feature of this invention to connect bisectors intermediate a gas tube switching network to improve the marking margins of the network, the bisectors being the match stage at which the path is established through the network.

Figures 2, 3:
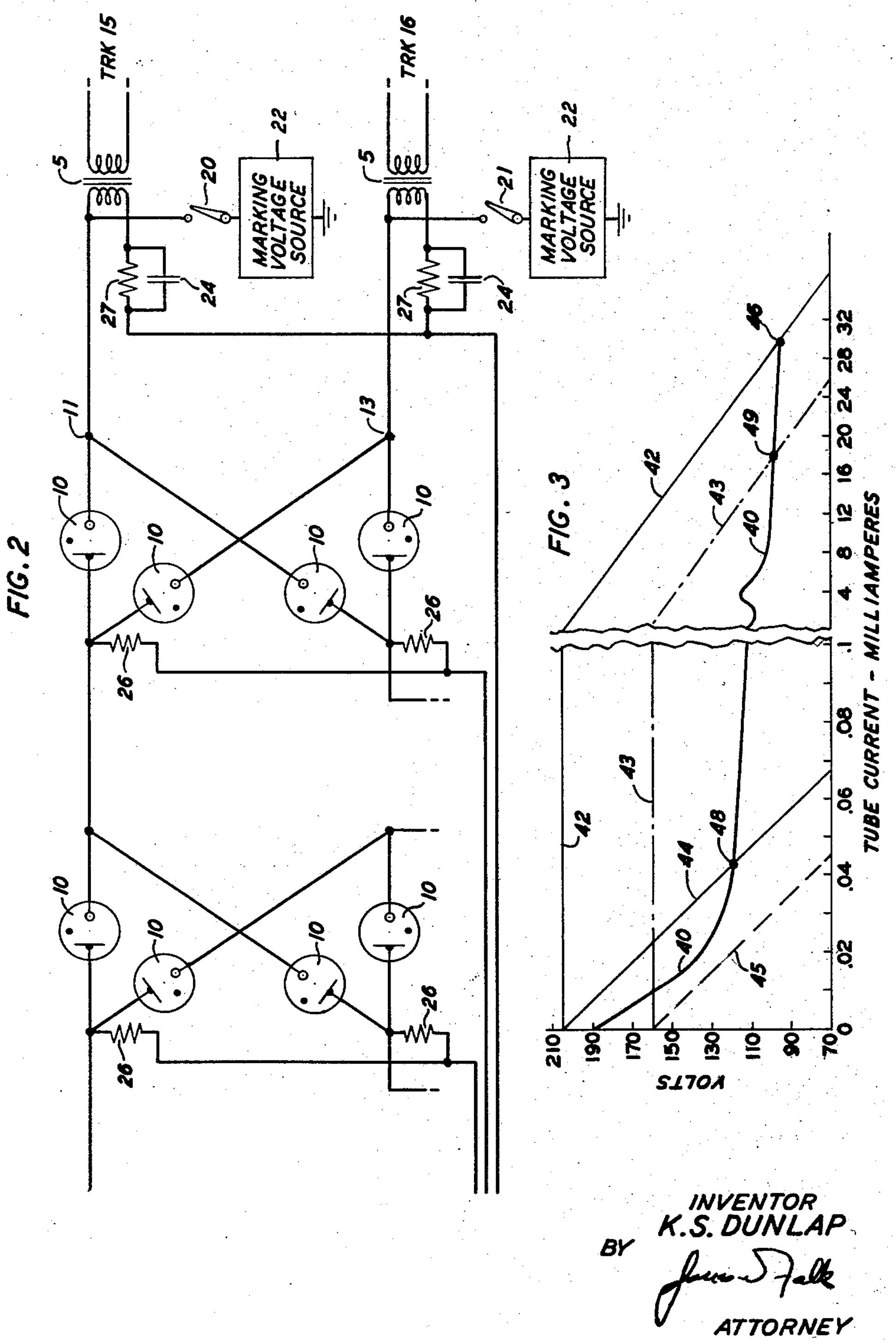

A complete understanding of this invention and of these and various other features thereof may be gained from consideration of the following detailed description and the accompanying drawing in which:

Figs. 1 and 2 when placed side by side depict a schematic representation of a portion of a crosspoint switching network in accordance with one specific illustrative embodiment of this invention; and Fig. 3 is a graphical representation of a typical voltage-current characteristic curve of the crosspoint devices together with certain load lines which, in combination with the curve, define operating points of the crosspoint devices in the network.

Figs. 1 and 2, when placed side by side, depict a schematic representation of a portion of a cross point switching network in accordance with one specific illustrative embodiment of this invention. Telephones 1 and 2 depict subscriber telephone sets which are connected to terminals 6 and 7, respectively, of the crosspoint network through individual transformers 5. Switches 3 and 4 are employed selectively to control the application of marking potentials from source 8 to the terminals of the network to control the establishing of communications paths through the network. The switching network may comprise a plurality of crosspoint devices such as gaseous discharge devices 10 connected together to define a plurality of possible paths through the switching network.

These crosspoint devices may be of the types disclosed in Patent 2,804,565 issued August 27, 1957, of M. A. Townsend and in the applications Serial No. 583,671, filed May 9, 1956, by A. D. White; and Serial No. 583,665, filed May 9, 1956, by R. L. Mueller and W. G. Stieritz. These gaseous discharge devices are characterized by having a negative resistance characteristic in the current and frequency ranges of operation in the network.

The opposite terminals 11 and 13 of the network are connected through transformers 5 to trunks 15 and 16 respectively. Subscribers' lines may be substituted for these trunks without affecting the manner of operation of the network. Switches 20 and 21 are employed selectively to connect the marking voltage to terminals 11 and 13, respectively, from source 22. Sources 8 and 22 may have any desired internal impedance which permits the required fanout current to flow, that is, marking current supplied to an increasing number of crosspoints in each stage more remote from the marked terminals. Source 25 supplies an idle bias to the network which is applied across each stage of crosspoint devices through resistors 26 and 27. This idle bias applied across each crosspoint device 10 is greater than the sustaining potential of the crosspoint devices but less than the ionization potential of these crosspoint devices. For example, if the sustaining potential is 100 volts and the breakdown or ionization potential is 200 volts, then the idle potential may be of the order of 160 volts. Resistors 26 may be of the order of 2 megohms and the combination of this high idle bias and the high resistance connected between the bias and the nodes of the network together with the removal of the marking potential produce lockout or deionization of crosspoints in the unselected paths on an individual basis as will be subsequently explained. Source 25 maintains a potential at low valued terminal resistors 27 greater than the sustaining potential. For example, this may be 160 volts across the crosspoints connected to the network terminals while the resistance of resistors 27 may be 1500 ohms. Capacitors 24 are connected in parallel with resistors 27 to present a low impedance path to transmission currents in a manner well known in the art.

Semiconductor diodes 28 and 29 are interposed in the transmission path intermediate the crosspoint network. These diodes serve as bisectors to prevent variations in marking voltage on one side of the bisectors from combining with variations in marking voltage on the other side of the bisectors. With this arrangement, the network is effectively marked as if it were two networks having half the number of stages as the bisected network.

Assume for the purpose of explaining the operation of the network that subscriber 1 is to place a call over trunk 16 and that there are no priorly established paths through the network. On the basis of this assumption, switches 3 and 21, which are merely symbolic of the switching operation, are closed connecting marking source 8 to terminal 6 and connecting marking source 22 to terminal 13. The marking pulse applied to terminal 6 is positive and causes a sufficient rise in the potential applied across gaseous discharge devices 10A and 10B to cause these devices to ionize. In response to the ionization of diodes 10A and 10B, a pulse is transmitted through diode 10A to diodes 10C and 10D. In response to the ionization of 10B, a similar pulse is transmitted over lead 30 to other crosspoint devices in the second stage (not shown). In each instance, those crosspoint devices connected to a node to which a marking pulse is applied will be ionized provided the other terminals of the crosspoint devices are not connected to busy nodes. Thus, the marking pulses progress from switch 3 through the network to one side of bisector 28. Similarly, negative pulses from source 22 pass through switch 21 ionizing crosspoints until a pulse is applied to the other side of diode 28. Bisector 28 is normally back-biased due to the potentials applied by source 25. The incoming marking pulses applied to one side of the bisector are insufficient alone to overcome the back-bias. However, when marking pulses arrive at both electrodes of the bisector, they combine to overcome the back-bias and the ionization of the crosspoint devices on both sides of a bisector causes a shift in potential across the bisector such that the bisector is forwardly biased and transmission currents may now flow from terminal 6 through bisector 28 to terminal 13.

The ionized crosspoint devices in the unselected paths will be extinguished, on removal of the terminal marking potential, on an individual basis since the sustaining current for these devices will flow through the high node impedances as contrasted with the sustaining current for the crosspoint devices in the unique path which will flow through the low terminal impedances 27. In each of the unselected paths, the last device to be ionized will be that device most remote from the marked terminal. The sustaining current for this remote device in each unselected path flows through the high valued node resistor associated with that remote device. These node resistors when carrying the sustaining current cause a potential drop which reduces the potential across the remote crosspoints below the sustaining value and these remote devices will be extinguished. The next adjacent crosspoint in the unselected path now has all of its sustaining current flowing through its node resistor and in turn this next device will be extinguished. This automatic extinction operation progresses toward the marked terminal until all the crosspoints in the unselected paths are extinguished. Thus, no switches are required to reduce the node potentials after a unitary path is established through the network and the terminal potential is reduced. With this arrangement, the potential applied to the terminals of the network is sufficient to maintain only the established path in an ionized condition.

This can be further understood from consideration of the current voltage characteristic of Fig. 3 together with the load lines shown therein. Let us assume that diode 10A is in the unique path which is established between terminals 6 and 13 while diode 10B is in one of the unselected paths. The load lines for the diodes in the selected and unselected paths are shown in Fig. 3. Curve 40 depicts a characteristic curve of the crosspoint diodes 10 while lines 42, 43, 44 and 45 represent lines depicting the load presented to different crosspoints in the network. Line 42 represents the relatively low terminal impedance presented by marking voltage sources 8 and 22 to the crosspoints such as 10A in the selected path. Line 43 represents the relatively low impedance presented by resistors 27 to the crosspoints in the established path after the marking voltage is removed, while lines 44 and 45 represent the high node impedances connected to crosspoints in the unselected paths such as 10B for the conditions of applied marking voltage and applied sustaining potential respectively. The abscissae of Fig. 3 are plotted on two scales, one below .1 milliamperes and the other above .11 milliamperes, for the purpose of a more detailed representation of the operation.

It is understood that load lines 42 and 43 and characteristic curve 40 are continuous from one scale to another and that load lines 42, 43, 44 and 45 represent linear resistive loads. While the impedance of the terminal marking sources, such as source 8, and that of the terminal sustaining source, indicated by resistor 27, are not necessarily the same, they are approximately so in comparison to the impedance of the node resistors 26 and accordingly in Fig. 3 the load lines 42 and 43 can be considered to be parallel to each other and as if they were representative of the same impedance. In the specific embodiment described above, the impedance of the source 8 may be of the order of 600 to 1000 ohms and that of the resistor 27 may be 1500 ohms as compared to an impedance of 2 megohms for the node impedances 26. The exact value of the impedance of the marking source is dependent on the required fanout current needed in the network and to enable recognition of the increase in current when the path is established through the network, thereby indicating that the marking potential may be removed to allow the automatic operation of the circuit to extinguish the redundant ionized tubes, as described herein.

If a marking voltage is applied to terminal 6 of the order of 205 volts and the path is established through diode 10A to terminal 13, the sustaining current for diode 10A passes between relatively low impedance source 8, and diode 10A effectively sees an impedance which is represented by load line 42. The last crosspoint in the unselected path connected to diode 10B effectively sees a load as depicted by load line 44. Both diodes 10A and the diodes in the unselected path connected to diode 10B will be sustained as long as the potential applied to terminal 6 remains in the region of 205 volts. During this period, diode 10A begins to conduct more current as an increasing number of crosspoint devices subsequent to the first stage are ionized. This current may rise to a value even as high as 30 milliamperes, depending on the number of stages, at which time diode 10A may be operating at point 46 which defines the intersection of characteristic curve 40 and load line 42. Since diode 10B is not in an established path through the netowrk, its sustaining current flows through its associated high valued node resistor 26 and diode 10B will be operating at point 48 which is the intersection of the diode characteristic curve and load line 44. When the path is established between terminals 6 and 13, which may be recognized by an increased current flow through the terminals, the marking sources are removed. The current flow through the terminals on establishment of the path with the marking sources still applied may be set at any desired value, such as 60 milliamperes, sufficient to enable discrimination between it and the maximum fanout current. When the terminal potential is reduced by disconnecting sources 8 and 22 by opening switches 3 and 21 in response to the establishment of a path through the network indicated by the rise in current through sources 8 and 22, the voltage applied to the terminal is decreased to a value sufficient to apply approximately 160 volts across each crosspoint and its associated node resistor. This reduced voltage or holding potential is supplied by source 25. At this time, diode 10A sees a load which is depicted by line 43, which line represents the impedance presented by low valued resistors 27. Since load line 43 still intersects characteristic curve 40, diode 10A and the other diodes in the selected path will shift their operating point from point 46 to point 49 and remain ionized. The remote diodes connected to diode 10B, however, will see a load as depicted by load line 45 which does not intersect the characteristic curve 40 because it falls below the sustaining region for the diode characteristic. Therefore, the diodes in the unselected paths such as those connected to diode 10B will be extinguished in turn beginning with the most remote from the selected terminals because of the drop in potential across their associated node resistors 26.

After the communications are completed, the unitary path may be disestablished in any convenient manner well known in the art. One example of a disconnect technique is to apply as per switch 3 or 21 a pulse of opposite polarity from the marking pulse to one of the previously selected terminals of the network.

Thus, it is seen that the application of a permanently applied high idle bias through high valued connecting node resistors 26 together with the removal of marking potential after the unitary path is established through the network will accomplish deionization of the crosspoints in the unselected paths without the requirement of switches to change the node potentials provided these applied potentials are greater than the sustaining potential and the values of node resistance are quite large. Further, relatively low impedance sources may be employed to apply the marking and holding potentials to the terminals of the network without incurring the possibility of cross-connecting an established path with a path being established through the network. Also, the use of low impedance sources to apply the holding potentials to the network terminals reduces the power loss while a path is established.

It is also seen that the use of bisectors improves the marking margins, permitting a larger number of stages of crosspoints to be employed and also permitting the use of crosspoints having greater variations in operating characteristics.

While this network was depicted as having four stages of crosspoint devices, any number of stages may be employed depending upon the number of subscribers. Also, propagators may be employed intermedite the network to generate new marking pulses to subsequent stages in the network in response to an incoming marking pulse and thus further improve the marking margins of the network. Examples of these propagator circuits are to be found in R. W. Ketchledge applications Serial Nos. 617,189 filed October 19, 1956; 426,338, filed April 29, 1954; and application Serial No. 617,060, filed October 19, 1956 by K. S. Dunlap and J. P. Taylor.

Another example of bisector circuits is disclosed in application Serial No. 617,131, filed October 19, 1956 by G. E. Jacoby and J. W. Rieke.

It is to be understood that the above-described arrangements are illustrative of the application of the principles of the invention. Numerous other arrangements may be devised by those skilled in the art without departing from the spirit and scope of the invention.

What is claimed is:

1. A communication switching network wherein a unitary path is established through the network without application and removal of marking voltages at internal points in the network comprising a plurality of input terminals, a plurality of output terminals, crosspoint devices connected at nodes and arranged in stages interconnecting each of said input and output terminals, means for applying marking voltages to selected input and output terminals, low resistance potential means connected to said terminals, high resistance means connected to each of said nodes, and means permanently maintaining a potential on said high resistance means at points remote from said nodes, whereby on removal of said marking voltages from said selected terminals conduction in crosspoint devices in unselected paths is extinguished in response to the decrease in potential across said devices caused by the potential drop across said high resistance means on flow of current through said low resistance means, said conducting device, and said high resistance means.

2. A communication switching circuit comprising a plurality of input terminals, a plurality of output terminals, crosspoint devices cross-connected at nodes and arranged in stages interconnecting each of said input and output terminals, means for establishing a unitary path between a selected one of said input terminals and a selected one of said output terminals including high impedance means for applying a potential to said nodes appreciably greater than the sustaining potential but less than the ionization potential of said crosspoint devices, bisector means connected in said switching circuit for improving the voltage margins in said circuit, and means for selectively applying marking voltages to said selected input and output terminals.

3. A communication switching circuit in accordance with claim 2 wherein bisector means includes a plurality of semiconductor diodes and further includes means maintaining said semiconductor diodes in a normally back-biased condition.

4. A communication switching circuit in accordance with claim 3 wherein each of said semiconductor diodes is serially connected intermediate said crosspoint devices.

5. A communication switching circuit comprising a plurality of input terminals, a plurality of output terminals, gaseous discharge crosspoint devices arranged in stages interconnecting each of said input and output terminals, means for establishing a unitary path between a selected one of said input terminals and a selected one of said output terminals including permanently connected high impedance means for biasing said crosspoint devices appreciably above the sustaining potential, means for applying marking voltages to said selected input and output terminals and for removing said marking voltages from said selected terminals after a unitary path is established, and means including said high impedance biasing means for automatically deionizing the gaseous discharge devices in the unselected paths.

6. A communication switching circuit comprising a plurality of input terminals, a plurality of output terminals, crosspoint devices arranged in stages interconnecting each of said input and output terminals and means for establishing a unitary path between a selected one of said input terminals and a selected one of said output terminals including means for applying marking voltages to said selected input and output terminals, high impedance means applying a voltage to said crosspoint devices having a magnitude intermediate the ionizing and the sustaining voltages of said devices, a plurality of bisector means intermediate said network for isolating the marking voltages on one side of said bisector means from the crosspoint devices on the other side of said bisector means, and means normally maintaining each of said bisector means in a high impedance condition, one of said bisector means being rendered in a low impedance condition only in response to the application of marking voltages from both of said selected input and output terminals.

7. A communication switching network comprising a plurality of input terminals, a plurality of output terminals, crosspoint devices arranged in stages interconnecting said input and output terminals and means for establishing a unitary path between a selected one of said output terminals and a selected one of said input terminals without the necessity for switching the applied potentials intermediate the network including means for applying marking voltages to said selected input and output terminals and for removing said marking voltages after a unitary path is established, high impedance means applying a voltage to said crosspoint devices having a magnitude intermediate the ionizing and the sustaining voltages of said device, and low impedance means applying sustaining potential to said terminals, whereby a unitary path is established through the stages between said selected input and output terminals and the crosspoint devices in the unselected paths which were ionized by the application of marking voltages to said selected terminals will be automatically extinguished by the reduction in potential caused by the sustaining current flow through said high impedance means associated with each of said unselected crosspoints.

8. A communication switching network comprising a plurality of input and output terminals, a plurality of gaseous discharge devices connected in stages between said input and output terminals, means for applying marking potentials to said terminals, low impedance means for applying sustaining potentials to said terminals, means permanently applying a potential across each gaseous discharge device substantially intermediate the sustaining and breakdown potential of said devices, and high impedances in series with said last-mentioned means and said devices, said high impedances having a value sufficiently high to cause deionization of gaseous discharge devices not included in a path between an input and an output terminal on removal of said marking potentials from said terminals without removal of said last-mentioned potential means from said devices.

9. A communication switching network comprising a plurality of input terminals, a plurality of output terminals, a plurality of gaseous discharge devices interconnected between said input and output terminals to define a plurality of possible paths therebetween, potential source means connected permanently across each of said gaseous discharge devices for applying across each of said devices a potential appreciably greater than the sustaining potential but less than the breakdown potential of said devices, a high valued resistor connected to each of said devices and to said potential source means, and means for applying marking potentials to selected input and output terminals to establish a unitary path through said network between said selected terminals, devices ionized by said marking potentials but not in said unitary path being automatically deionized on removal of said marking potentials by the decrease in potential across each of said devices individually caused by the potential drop across the high valued resistor connected thereto.

10. A communication switching network wherein a unitary path is established through the network without application and removal of marking voltages at internal points in the network comprising a plurality of input terminals, a plurality of output terminals, a plurality of gaseous discharge devices interconnecting said input and output terminals, means for applying marking potentials selectively to said input and output terminals, means permanently applying a potential across each of said gaseous discharge devices appreciably above the sustaining but less than the breakdown potential of said devices, a high impedance in series with each of said devices and said last-mentioned means, and low impedance means applying sustaining potentials to said input and output terminals, said high impedances having a value sufficiently high to cause deionization of gaseous discharge devices not included in a path between a selected input and output terminal on flow of current in series through said high impedance, associated discharge devices, and said low impedance sustaining potential means at a selected terminal without removal of said means permanently applying a potential from said associated discharge devices.

11. A communication switching network wherein a unitary path is established through the network without application and removal of marking voltages at internal points in the network comprising a plurality of input and output terminals, a plurality of gaseous discharge devices connected in stages between said input and output terminals, means for applying marking potentials to said terminals and for removing said marking potentials from said terminals on establishment of a path through said network, means permanently applying a potential across each gaseous discharge device substantially intermediate the sustaining and breakdown potential of said devices, high impedances in series with said last-mentioned means and said devices, and low impedance means applying sustaining potentials to said input and output terminals, whereby on removal of said marking potentials from said terminals ionization in each gaseous discharge device not in said path through said network is automatically extinguished by the flow of current in a circuit from said low impedance sustaining potential means through each discharge device individually to the high impedance and potential means connected in series therewith.

No references cited.